June 6, 1961
E. O. MELMER
2,987,008
TURNTABLE MECHANISM FOR CONVEYOR
Filed Nov. 20, 1957
3 Sheets-Sheet 1
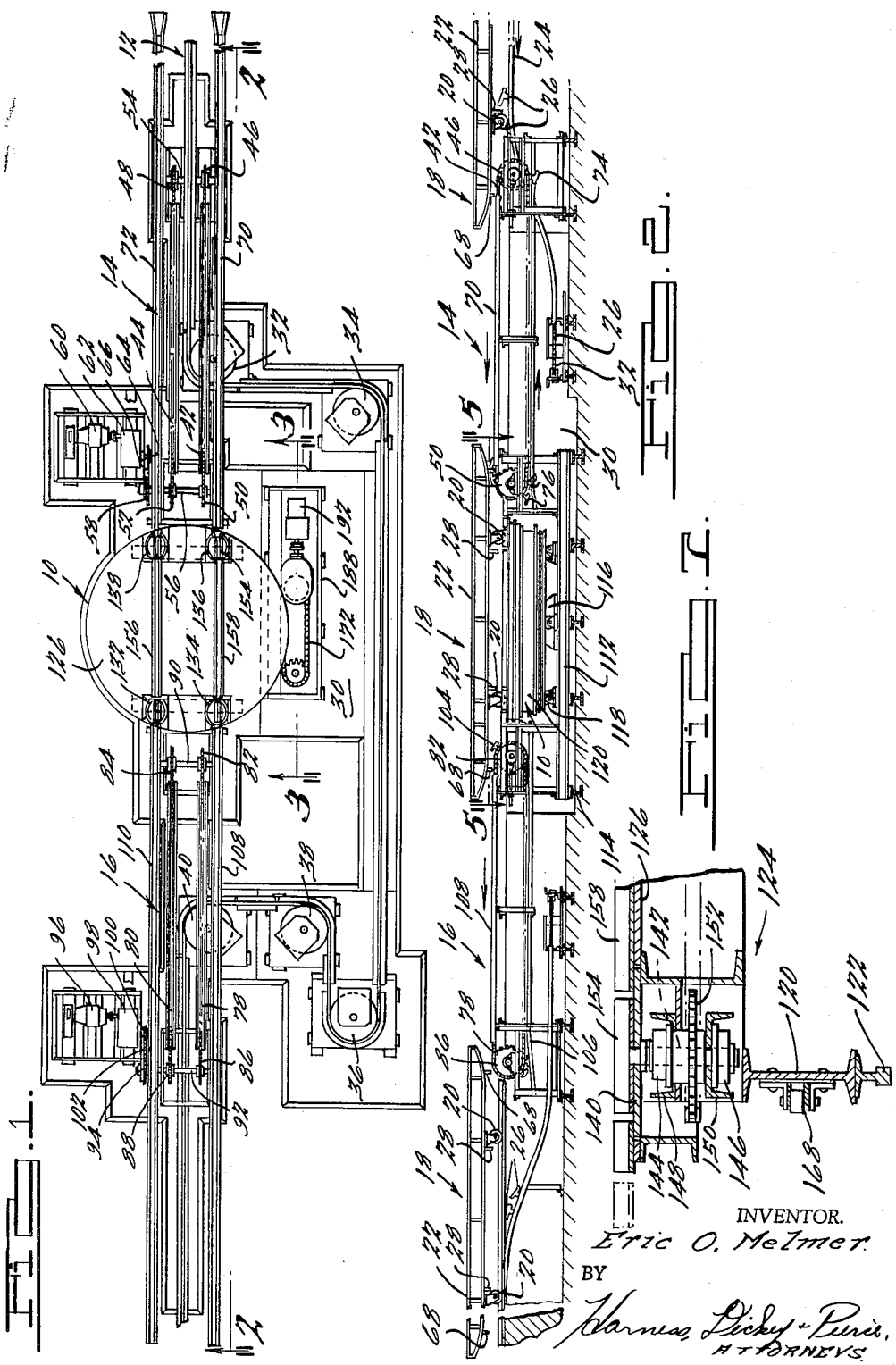
INVENTOR.
Eric O. Melmer
BY
Harness, Dickey & Pierce
ATTORNEYS.

June 6, 1961

E. O. MELMER 2,987,008

TURNTABLE MECHANISM FOR CONVEYOR

Filed Nov. 20, 1957

3 Sheets-Sheet 2

INVENTOR.
*Eric O. Melmer.*
BY
*Harness, Dickey & Pierce.*
ATTORNEYS

June 6, 1961  E. O. MELMER  2,987,008
TURNTABLE MECHANISM FOR CONVEYOR
Filed Nov. 20, 1957  3 Sheets-Sheet 3
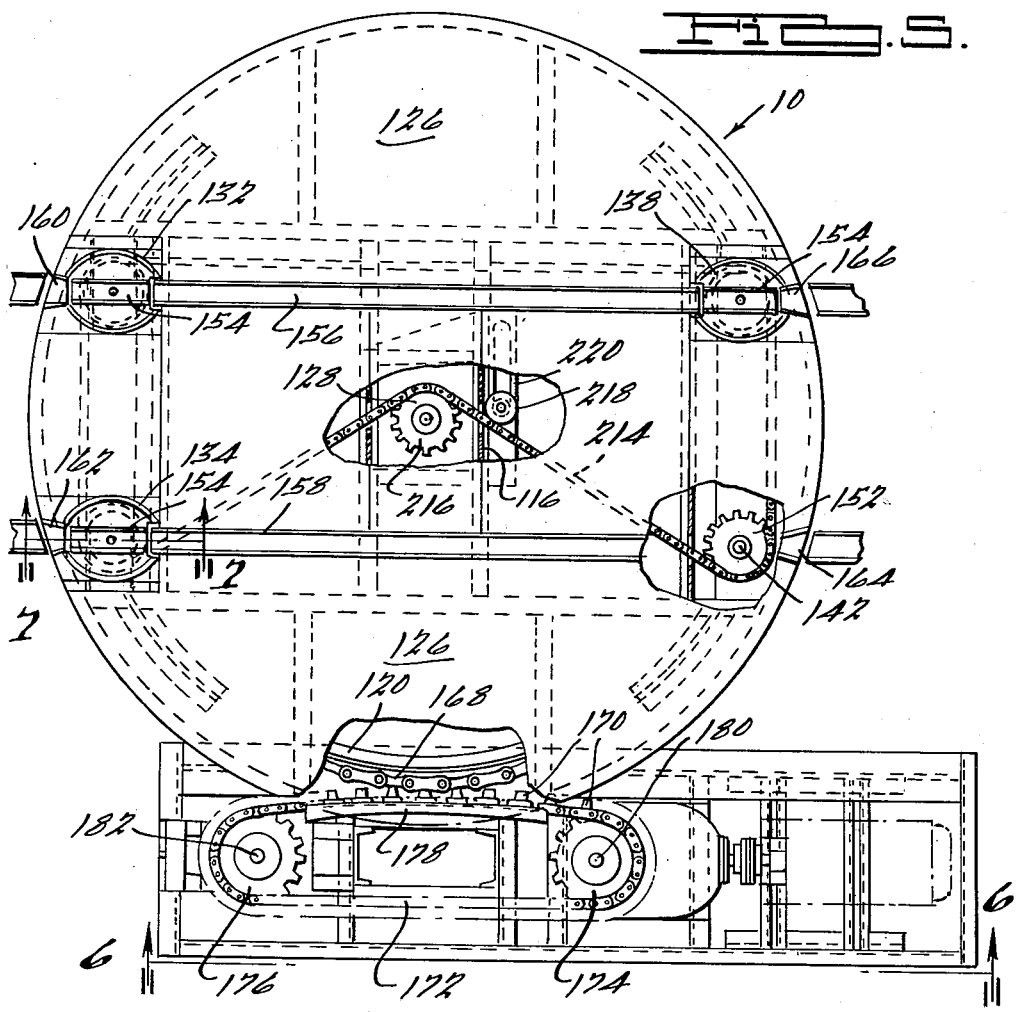
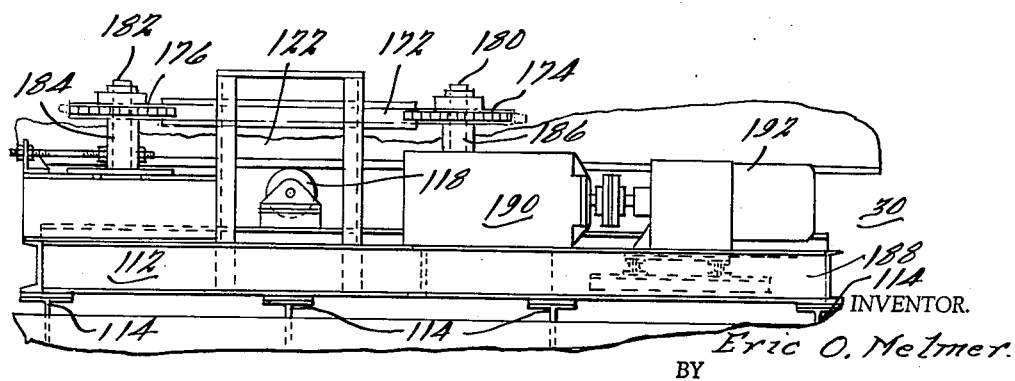
INVENTOR.
Eric O. Melmer
BY
Harness, Dickey & Pierce
ATTORNEYS.

United States Patent Office 2,987,008
Patented June 6, 1961

2,987,008
TURNTABLE MECHANISM FOR CONVEYOR
Eric Otto Melmer, Grosse Pointe Park, Mich., assignor to Palmer-Bee Company, Detroit, Mich., a corporation of Michigan
Filed Nov. 20, 1957, Ser. No. 697,671
14 Claims. (Cl. 104—36)

This invention relates to new and useful improvements in turntables of a type particularly adapted and primarily intended for use in industrial conveyor systems.

In many forms of industrial conveyors, work is mounted on a truck which rolls on conventional casters, and the truck is pulled through a series of stations by a suitable tow conveyor. Various operations are performed on the work in the different stations.

Accordingly, it is necessary to orient the work properly in each station. For instance, it sometimes is necessary to turn the work before it enters a particular station. This can best be done by means of a turntable; however, when the work is mounted on a caster truck of the type hereinabove referred to, difficulty is encountered if the work and its truck is simply turned bodily without also changing the direction of travel of the truck as the truck casters are not positioned to track properly after the truck has been turned. If the casters are not headed properly the truck tends to veer to one side and to run off the conveyor.

It is an important object of the present invention to provide a turntable construction that can be incorporated in a tow conveyor and that is adapted to turn the truck and the work while maintaining the casters headed at all times in the direction of travel of the conveyor.

Other objects and advantages of the invention will be apparent during the course of the following description.

Figure 3:
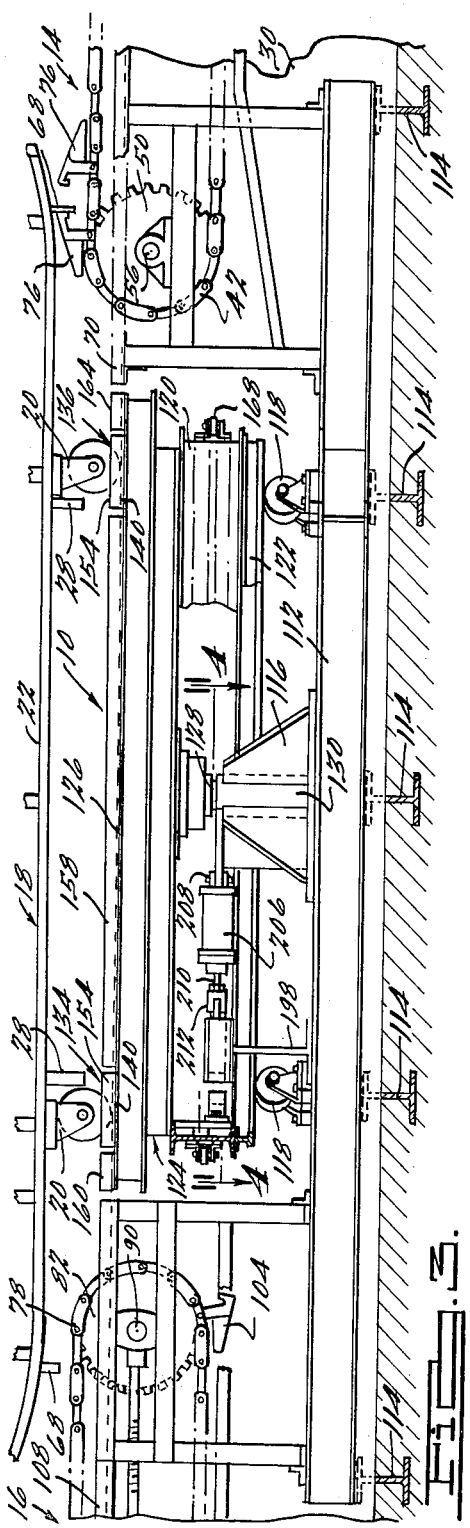
Figure 4:
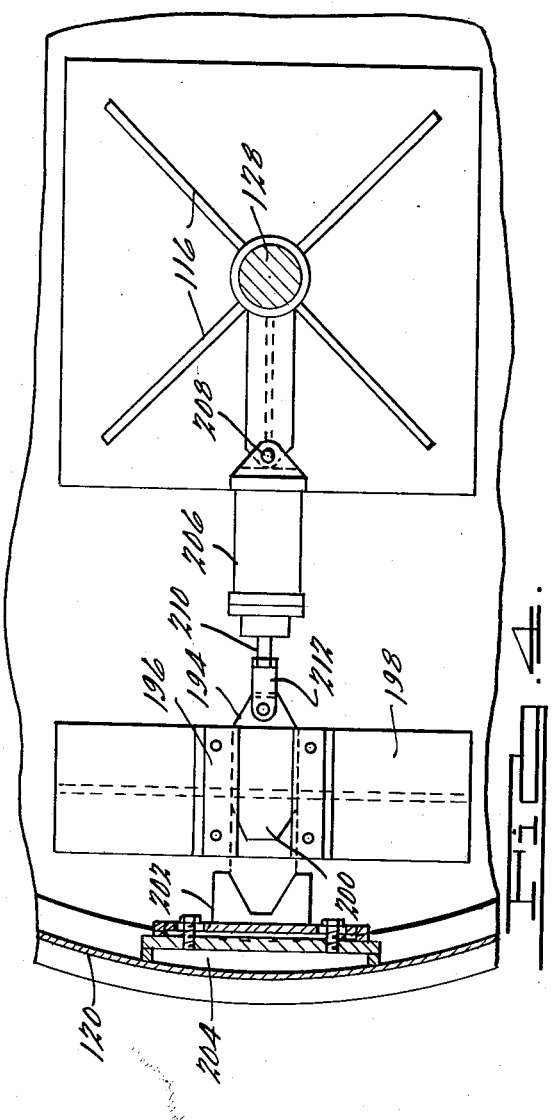

In the drawings forming a part of this specification and wherein like numerals are employed to designate like parts throughout the same, FIGURE 1 is a plan view showing a turntable embodying the invention incorporated in an industrial tow conveyor line, FIG. 2 is a vertical sectional view taken on the line 2—2 of FIG. 1, FIG. 3 is an enlarged, vertical sectional view taken on the line 3—3 of FIG. 1, FIG. 4 is a horizontal sectional view taken on the line 4—4 of FIG. 3, FIG. 5 is a horizontal sectional view taken on the line 5—5 of FIG. 2, FIG. 6 is a vertical sectional view taken on the line 6—6 of FIG. 5, and FIG. 7 is a fragmentary, vertical sectional view taken on the line 7—7 of FIG. 5.

In the drawing, a turntable 10 embodying the invention is shown by way of illustration in a tow conveyor line 12 and between a pair of speed-up conveyors 14 and 16 which preferably are of the type shown in my copending application Serial No. 698,725 filed on November 25, 1957, now abandoned. The conveyor system is adapted to tow a procession of trucks 18 which travel on supporting casters 20. The particular truck 18 here shown by way of illustration has a flat generally rectangular bed 22 on which is mounted a workpiece (not shown) to be processed as the truck travels down the line. Four casters 20 arranged in a generally rectangular pattern are provided under the bed 22.

Only a fragmentary portion of the conveyor 12 is here shown, but it will be understood that it may readily be any suitable or conventional type such as the ones shown for example, in the Preble Patent No. 1,959,085 or in the Ewend Patent No. 2,009,579. These conveyors have an endless chain 24 which is suitably supported and driven by spaced sprockets. Driving dogs 26 on the chain 24 engage pusher bars 28 on and depending from the trucks 18 to propel the latter along the path of travel of the conveyor. Two pusher bars 28 are here shown on each truck 18 one behind each pair of casters 20 so that the truck can be towed from either end. The driving dog 26 is always engaged with the front pusher bar 28, however, so that the truck casters 20 track properly in use.

The conveyor 12 preferably is normally disposed on or below the floor level except under special circumstances as where it is necessary to run the trucks 18 on elevated tracks. Accordingly, the trucks 18 normally travel on the floor and it is not necessary to provide channels or special tracks in which the casters 20 travel except in special situations, as for example, when the trucks are moved overhead on special elevated portions (not shown) of the conveyor. However, in adapting the conveyor to the special turntable situation of this invention tracks are provided for the casters 20 at the speed-up conveyors 14 and 16 and on the turntable 10. Opposed dogs 26 may be provided on the conveyor 12 as shown in FIG. 2 under conditions where it is necessary to prevent the truck 18 from overrunning the conveyor 12 as when traversing a downward slope or in situations where it is necessary to prevent the truck from coasting when the conveyor stops or disengages the truck. In many instances, however, it is possible to use only one dog 26 which engages behind the pusher bar 28.

A perhaps best shown in FIG. 2, the turntable 10 and the two speed-up conveyors 14 and 16 are disposed in a pit 30. The main conveyor 12 dips down into the pit 30 at the head of speed-up conveyor 14 and thereafter traverses sprockets 32, 34, 36, 38 and 40 around the turntable 10 (FIG. 1). As shown, the speed-up conveyor 14, turntable 10, and speed-up conveyor 16 are arranged to move the trucks 18 forwardly in a straight line from the main conveyor 12, and the latter emerges from the pit 30 at the discharge end of the speed-up conveyor 16 to pick up trucks discharged by the speed-up conveyor 16. In this connection, it will be observed that the sprocket 36 is adjustably mounted according to conventional practice to regulate the position of the dogs 26 as they emerge from the pit 30 so that the operation of the conveyor 12 is properly timed to pick up the trucks 18 as they come from the speed-up conveyor 16. It will readily be understood in this connection that the pit 30 is normally covered and that it is shown open in the drawings merely for purpose of illustration.

In further explanation of the movement of trucks 18 by the speed-up conveyors 14 and 16 and across the turntable 10, it will be observed (FIG. 3) that the speed-up conveyor 14 has spaced parallel endless chains 42 and 44 trained over sprockets 46, 48, 50, and 52 respectively. The two sprockets 46 and 48 are fixed on a rotatable shaft 54, and the sprockets 50 and 52 are similarly fixed on a rotatable shaft 56 having a driving sprocket 58. A motor 60 in the pit 30 beside the conveyor 14 is connected to a gear reduction unit 62, and the output shaft of the latter carries a sprocket 64 which drives the sprocket 58 through an endless chain 66. Each truck 18 is provided outwardly of the pusher bars 28 and adjacent the ends thereof with additional bars 68.

The main conveyor 12 moves each truck 18 to the speed-up conveyor 14, and as the truck approaches the speed-up conveyor the casters 20 enter parallel guide channels 70 and 72. When the main conveyor 12 dips into the pit 30, the dogs 26 disengage the pusher bar 28 of the truck 18. At the time the truck 18 is released by the conveyor 12, the motor 60 is started in operation and dogs 74 on the endless chains 42 and 44 move around the sprockets 46 and 48, as shown by the arrow in FIG. 2, to engage the forward pusher bar 68 of the truck. The motor 62 can be energized in any suitable or conventional manner as by means of a limit switch (not shown) operated by the truck 18 as it moves to final position hereinabove referred to. The dogs 74 push the truck 18 along the guide channels 70 and 72 until they move around the forward sprockets 50 and 52 and disengage the pusher bar 68. Almost immediately, however, another set of dogs 76 on the endless chains 42 and 44 engage the rearmost pusher bar 68 of the truck 18 and push the truck onto the turntable 10. As soon as the truck 18 moves onto the turntable 10, the motor 60 is de-energized in any suitable or conventional manner as by means of a limit switch (not shown) operated by the truck. At the same time the motor 60 is de-energized, the turntable 10 is actuated to turn or rotate the truck 18 and the work carried thereby. If desired, the turntable 10 can be operated by the same limit switch that de-energizes the motor 60. In the particular apparatus here shown by way of illustration, the turntable 10 is adapted to turn the truck 180°. This turns the truck 18 end-for-end and reverses the position of the work on the line.

After operation of the turntable 10, the truck 18 is pulled therefrom by the speed-up conveyor 16. To this end it will be observed that the conveyor 16 is formed similarly to the conveyor 14 with spaced parallel endless chains 78 and 80 trained over sprockets 82, 84 and 86, 88. The sprockets 82 and 84 are fixed on a rotatable shaft 90, and the sprockets 86 and 88 are mounted on a rotatable shaft 92 which carries a driving sprocket 94. A motor 96 is connected to a gear reduction unit 98 having a driving sprocket 100 which is connected to the sprocket 94 by an endless chain 102.

As the table 10 completes its turning operation, the motor 96 is energized to drive the speed-up conveyor 16; and, in this connection, it will be appreciated that any suitable or conventional means may be employed to energize the motor 96 in proper timed sequence with the operation of the turntable. For instance, a limit switch in the operating circuit of the motor 96 can be actuated by the turntable 10 as it completes its operation. In any event, energization of the motor 96 causes the endless chains 78 and 80 to move in the direction of the arrow, as shown in FIG. 2, and dogs 104 on the chains engage the overhanging front outer pusher bar 68 to pull the truck 18 from the turntable 10. As the truck 18 is pushed along the speed-up conveyor 16 the truck casters travel in guide channels 108 and 110. The truck is moved along by the above mentioned dogs 104 until the latter move around the sprockets 86 and 88 and disengage the forward pusher bar 68. Almost immediately, however, a second set of dogs 106 (FIG. 2) on the chains 78 and 80 engage the rear outer pusher bar 68 to push the truck 18 to the position shown at the extreme left of FIG. 2. In this position of the truck 18, the forward inner pusher bar 28 thereof is disposed for engagement by the dogs 26 of main conveyor 12. The guide channels 108 and 110 extend for a short distance along the main conveyor 12 so as to hold the truck 18 properly for engagement with the dogs 26 and to guide it for a short distance after it is picked up by the main conveyor. As suggested, the main conveyor 12 is intended to tow a procession of trucks 18 with workpieces thereon in uniformly relatively closely spaced relation and at a relatively slow speed that permits work to be performed on the workpieces as they pass through work stations located along the line. Turntables 10, are, of course, provided in the conveyor line whenever it is necessary or desirable to reorient or change the position of the workpiece as it moves down the line. Ordinarily, the trucks 18 are disposed relatively close together on the conveyor 12 for maximum efficiency in operation. Accordingly, since the conveyor 12 runs continuously, it is not possible simply to run a truck onto the turntable directly from the main conveyor, then operate the turntable to reverse the direction of travel of the truck, and then reengage the truck directly with the main conveyor to remove it from the turntable without interference from the following truck. This contingency, however, is taken care of in the instant apparatus by the speed-up conveyors 14 and 16 which operate at a relatively higher speed than the main conveyor 12. The speed-up conveyor 14 pulls each truck off of the main conveyor 12 as the latter is delivered thereto and moves it onto the turntable 10 at a considerably higher rate of speed than the established rate of travel of the main conveyor. Similarly, the speed-up conveyor 16 pulls the reoriented truck from the turntable 10 at a relatively high rate of speed and positions it for re-engagement with the main conveyor 12. By properly timing the operating rates of the various mechanisms, viz., the main conveyor 12, speed-up conveyor 14, turntable 10 and speed-up conveyor 16, it is possible to take each truck as it comes from the main conveyor, turn it end-for-end in the case of the particular apparatus here shown by way of illustration, and deliver it again to the main conveyor without interference between the trucks. Further, it is possible to deliver these trucks to the main conveyor at the discharge end of the speed-up conveyor 16 in the same uniformly spaced relation in which they are delivered to the speed-up conveyor 14.

FIGS. 3–7 illustrate in detail the construction of the turntable 10. As shown, the turntable has a base frame 112 suitably mounted on I-beam supporting members 114. Disposed centrally of and mounted on the base frame 112 is a pedestal 116 which supports a vertical shaft 130. The latter extends above the pedestal 116 and into a bearing 128 on and centrally of the turntable 10. An annular series of rollers 118 around and concentric to the pedestal 116 provide outboard support for the table 10. The rotatable portion of the table 10 comprises an annular main frame member 120 surmounting an annular track 122 which travels on the rollers 118 and supporting a table frame 124 on which is mounted a circular sheet metal table 126. It will be apparent that the rotatable table assembly turns on the shaft 130 and is supported during such rotation by rollers 118.

Four individual caster turntables 132, 134, 136 and 138 (FIG. 5) are mounted on the table 126 in a generally rectangular pattern and arranged to receive the four casters 20 of the truck 18 when the latter is disposed bodily on the turntable 10. Each of the caster turntables 132, 134, 136 and 138 comprises a disk-shaped plate 140 (FIG. 7) mounted in an opening provided in the table 126 and having a depending shaft 142 journaled in bearings 144 and 146 carried by members 148 and 150 of the table frame 124. A sprocket 152 is fixed to the shaft 142 between the frame members 148 and 150. Surmounting the plate 140 is a channel-shaped caster track 154. The shaft 142 is adapted to be rotatably driven by the sprocket 152, and as it rotates it turns the plate 140 and the caster track 154.

As best shown in FIG. 5, the caster tracks 154 align with similarly shaped intermediate tracks 156 and 158 on the table 126 and with relative short outer track sections 160, 162, 164 and 166 also on the table. When the various track sections of the turntable are aligned in this manner and the table is positioned to align these tracks with the channel guides 70, 72 and 108, 110 of the speed-up conveyors 14 and 16 a throughway is provided for the trucks 18.

In order to rotate the turntable 10 a chain 168 is provided around and fixed to the annular main frame member 120, and the chain 168 is engaged by the teeth 170 of a caterpillar chain 172 trained over a driving sprocket 174 and an idler sprocket 176 (FIG. 5). A backup guide 178 holds the teeth 170 properly in mesh with the chain 168. The sprockets 174 and 176 are mounted on vertical shafts 180 and 182 which are journaled for rotation in bearings 184 and 186 on a subframe 188 beside the turntable 10. The shaft 180 which carries the driving pulley 174 is the output shaft of a gear reduction unit 190 which is rotatably driven by a motor 192 also mounted on the frame 188.

The turntable 10 is stopped exactly after each 180° rotation with the caster guides 156 and 158 aligned with the guide channels 70, 72 and 108, 110 of the speed-up conveyors 14 and 16 by a locating bar 194 which is slidably mounted in a guide 196 (FIG. 4). The guide 196 is mounted on a support 198 (FIG. 3) disposed within the annular main frame member 120, and it positions the bar 194 for sliding movement radially of the turntable 10. The outer end 200 of the bar 194 is tapered and is adapted to fit snugly within the recess of a V-block 202 which is fastened securely to a mounting block 204 on the main frame member 120. Only one V-block 202 is here shown but it will be understood that two such V-blocks are provided 180° apart in the frame 120. A power cylinder 206 is pivotally connected at 208 to the pedestal 116, and the piston rod 210 thereof is connected to the bar 194 by a clevis 212. The power cylinder 206 can be connected to any suitable source (not shown) of fluid under pressure to actuate the guide 194.

It is contemplated of course, that the operation of the power cylinder 206 be controlled by a four-way valve (not shown) in the conventional manner and that the valve be operated by a limit switch (not shown) actuated by the V-block 202 or any other convenient part of the turntable 10. Such controls are old and well known in the art and therefore are not shown here in detail. It will be readily appreciated, however, that the power cylinder 206 is operated to advance the guide 194 into engagement with a V-block 202 each time either of the blocks moves into position in front of the plunger and that wedging action of the plunger in the V-block stops the turntable 10 with the turntable caster tracks aligned exactly with the corresponding tracks of the speed-up conveyors 14 and 16.

While the turntable 10 is being rotated or indexed in the manner hereinabove described the individual caster turntables 132—138 revolve about the fixed axis of shaft 130 and each caster turntable also is rotated about the axis of its respective shaft 142 by an endless chain 214 trained over a stationary sprocket 216 on the pedestal 116 and around the sprockets 152 of the four caster turntables. Thus, the relation of parts is that of an epicyclic or planetary system. A chain tightener 218 carried by an adjustable mounting 220 on the table frame 124 engages the chain 214 to take up slack therein.

It may thus be seen that I have achieved the objects of my invention. I have provided a conveyor system for caster trucks which includes a turntable for turning the trucks as they are moved along by the conveyor. The turntable is incorporated in the conveyor line so that the trucks which normally move along relatively close together can be taken from the line, rotated and then returned thereto without disturbing the spacing of the trucks on the line or the relative position of the trucks in the line. Furthermore, the trucks are rotated or turned without changing the truck casters so that tracking of the trucks in proper operation thereof by the conveyor is in no way affected by the turning operation.

Having thus described the invention, I claim:

1. In a conveyor system, a primary turntable for caster trucks, a main conveyor for towing a succession of trucks in relatively closely spaced relation, said conveyor having a portion arranged in by-pass relation to said turntable and said by-pass portion adapted to disengage said trucks at the beginning of the by-pass portion and to re-engage said trucks at the end of said by-pass portion, a speed-up conveyor between the beginning of said by-pass portion and said turntable adapted to pick up trucks disengaged by said main conveyor and to move the same onto said turntable, said speedup conveyor having ways in which the truck casters travel between said main conveyor and said turntable, a second speed-up conveyor between said turntable and the end of the by-pass portion of said main conveyor for moving trucks from said turntable to said main conveyor for re-engagement by the latter, said last mentioned speed-up conveyor having ways in which the truck casters travel from the turntable to said main conveyor, ways on said turntable aligned with the ways of said speed-up conveyors for guiding the truck casters during movement thereof across said turntable, a plurality of caster turntables on and rotatable relative to said primary turntable and revolvable thereby for supporting the casters of a truck disposed on said turntable, means for rotating said primary turntable, and means for controlling rotation of the caster turntables whereby each caster turntable rotates once relative to the primary turntable for each rotation of said primary turntable.

2. In a conveyor system, a primary turntable for caster trucks adapted to accommodate a truck bodily thereon and having a plurality of relatively small individual caster turntables one for each caster of the truck, said caster turntables being positioned to engage and support the truck casters when a truck is disposed bodily on said primary turntable, a main conveyor for towing a succession of said trucks, said conveyor having a portion arranged in by-pass relation to said turntable adapted to disengage said trucks at the beginning of said by-pass portion and to re-engage said trucks at the end of said by-pass portion, a speed-up conveyor adapted to receive trucks disengaged by said main conveyor and to move the same onto said primary turntable, a second speed-up conveyor adapted to receive trucks from said primary turntable and to move the same for re-engagement by said main conveyor, means for rotating said primary turntable, whereby to revolve said caster turntables about the axis of said primary turntable, and means for controlling rotation of said caster turntables whereby each caster turntable rotates once relative to the primary turntable for each rotation of said primary turntable.

3. In a conveyor system, a turntable for caster trucks, a main tow conveyor for moving a succession of said trucks, said conveyor having a portion arranged in by-pass relation to said turntable, a speed-up conveyor adapted to receive trucks from said main conveyor and to move the same at an accelerated rate onto said turntable, a second speed-up conveyor for receiving trucks from said turntable adapted to deliver the same at an accelerated rate to said main conveyor, means for rotating said turntable with a truck thereon, and means associated with said turntable adapted to receive and support the truck casters and operable by rotation of said turntable to turn said casters simultaneously relative to the turntable so that said casters are held parallel to their initial positions at all times during rotation of said truck by said turntable.

4. In a conveyor system, a turntable for caster trucks, a main conveyor for towing caster trucks at a relatively slow rate of speed having a portion thereof arranged in by-pass relation to the turntable, a speed-up conveyor at one side of the turntable adapted to receive trucks from the main conveyor and to move the same on to the turntable at an accelerated rate, and a speed-up conveyor at the other side of said turntable adapted to receive trucks from the turntable and to deliver them also at an accelerated rate to said main conveyor.

5. In a conveyor system, a turntable for a truck of the type mounted and adapted to travel on supporting casters, said turntable comprising a primary supporting structure mounted for rotation about a vertical axis and having a depending annular skirt, said primary supporting structure adapted to be traversed by said truck and having horizontal parallel ways on which the truck casters travel, said structure being sufficiently large to accommodate said truck bodily thereon during such traverse, a plurality of rotatable track sections forming a part of said ways and arranged so that each supports a respective one of said casters when a truck is disposed bodily on said structure, an endless chain surrounding and fixed to the skirt portion of said supporting structure, drive means including a caterpillar chain having teeth engageable with said endless chain and operative to turn said supporting structure on its axis, a stationary driving sprocket at the center of said structure, driven sprockets associated and rotatable with said track sections, and an endless chain extending around and meshing with said drive and driven sprockets, whereby said supporting structure can be rotatably actuated to turn a truck thereon end-for-end without changing the direction of extent of said casters.

6. In a conveyor system, a turntable for a truck of the type mounted and adapted to travel on supporting casters, said turntable comprising a primary supporting structure mounted for rotation about a vertical axis, said structure adapted to be traversed by said truck and having horizontal parallel ways on which the truck casters travel, said structure being sufficiently large to accommodate said truck bodily thereon during such traverse, a plurality of track sections forming a part of said ways and arranged so that each supports a respective one of said casters when the truck is disposed bodily on said structure, a stationary driving sprocket at the center of said structure, driven sprockets on and rotatable with the pivots of said track sections, an endless chain engaging said driving sprocket and all of said driven sprockets, and means for rotatably driving said structure, whereby a truck on said structure and supported by said track sections can be turned end-for-end without changing the direction of extent of the truck casters.

7. In a conveyor system, a turntable for a truck of the type mounted and adapted to travel on supporting casters, said turntable comprising a primary supporting structure mounted for rotation about a vertical axis, said structure adapted to be traversed by said truck and having horizontal parallel ways on which the truck casters travel, said structure being sufficiently large to accommodate said truck bodily thereon during such traverse, a plurality of pivoted track sections forming a part of said ways and arranged so that each supports a respective one of said casters when the truck is disposed bodily on said structure, rotary drive means on and fixed to the pivot of each track section, means coactive with said drive means rendered operative by rotation of said turntable to turn all of said track sections in unison and at a rate whereby said track sections and the casters of said truck rotate once relative to said turntable for each rotation of said turntable, and means for rotatably driving said supporting structure so as to turn a truck mounted thereon end-for-end.

8. In a conveyor system, a turntable for a truck of the type mounted and adapted to travel on supporting casters, said turntable comprising a primary supporting structure mounted for rotation about a vertical axis, said structure adapted to be traversed by said truck and having horizontal parallel ways on which the truck casters travel, said structure being sufficiently large to accommodate said truck bodily thereon during such traverse, a plurality of pivoted track sections forming a part of said ways and arranged so that each section supports a respective one of said casters when the truck is on said structure, rotary drive means for said structure adapted to turn a truck mounted thereon, a driven member on and rotatable with the pivot of each track section, a stationary drive member and a continuous driving element connecting said stationary drive member and all of said driven members and operative to turn all of said track sections in unison during turning of said supporting structure so that said track sections remain parallel to their initial position at all times during rotation of said supporting structure.

9. In a conveyor system, a turntable for a truck of the type mounted and adapted to travel on supporting casters, said turntable comprising a primary supporting structure mounted for rotation about a vertical axis, said structure adapted to be traversed by said truck and having horizontal parallel ways on which the truck casters travel, said structure being sufficiently large to accommodate said truck bodily thereon during such traverse, a plurality of track sections forming a part of said ways and arranged so that each supports a respective one of said casters when the truck is disposed bodily on said structure, rotary drive means for turning said structure in 180° increments of motion so as to turn a truck mounted thereon end-for-end, and means driven by rotative movement of said structure for turning said track sections in unison during turning of said structure so that said track sections remain parallel to their initial positions at all times during rotation of said structure.

10. In a conveyor system, a turntable for a truck of the type mounted and adapted to travel on supporting casters, said turntable comprising a primary supporting structure mounted for rotation about a vertical axis, said structure adapted to be traversed by said truck and having horizontal parallel ways on which the truck casters travel, said structure being sufficiently large to accommodate said truck bodily thereon during such traverse, a plurality of track sections forming a part of said ways and arranged so that each supports a respective one of said casters when the truck is disposed bodily on said structure, means mounting said track sections for rotation about vertical axes on and relative to said structure, means for rotatively driving said structure so as to turn a truck mounted thereon end-for-end, and means coactive with said drive means and simultaneously operable on said track sections to turn the latter in unison during rotation of said structure so that said track sections remain parallel to their initial positions at all times during rotation of said structure.

11. In a conveyor system, a turntable for a truck of the type mounted and adapted to travel on supporting casters, said turntable comprising a primary supporting structure mounted for rotation about a vertical axis, said structure adapted to be traversed by said truck and having horizontal parallel ways on which the truck casters travel, said structure being sufficiently large to accommodate said truck bodily thereon during such traverse, a plurality of track sections forming a part of said ways and arranged so that each supports a respective one of said casters when the truck is disposed bodily on said structure, means mounting said track sections for rotation on and relative to said structure, means for turning said structure on its axis, and means for turning said track sections in unison during turning movement of said structure.

12. In a conveyor system, a primary turntable for caster trucks, a tow conveyor arranged and adapted to deliver caster trucks at one side of said primary turntable, a tow conveyor arranged to pick up caster trucks from another side of said primary turntable, a speed-up conveyor between said first mentioned tow conveyor and said primary turntable adapted to pick up trucks delivered by said tow conveyor and to move the same at an accelerated rate onto said primary turntable, said speed-up conveyor having ways in which the truck casters travel between said tow conveyor and said primary turntable, a second speed-up conveyor between said primary turntable and said second mentioned tow conveyor adapted to move trucks at an accelerated rate from said primary turntable to said tow conveyor, said last mentioned speed-up conveyor having ways in which the truck casters travel from the primary turntable to said tow conveyor, ways on said primary turntable aligned with the ways of said speed-up conveyors for guiding the truck casters during movement thereof across the said primary turntable, a plurality of caster turntables on and rotatable relative to said primary turntable and revolvable thereby for supporting the casters of a truck disposed on said primary turntable, means for rotating said primary turntable, and means for controlling rotation of the caster turntables whereby each caster turntable rotates once relative to the primary turntable for each rotation of said primary turntable.

13. In a conveyor system, a primary turntable for caster trucks, a tow conveyor arranged and adapted to deliver caster trucks at one side of said primary turntable, a tow conveyor arranged to pick up caster trucks from another side of said primary turntable, a speed-up conveyor between said first mentioned tow conveyor and said primary turntable adapted to pick up trucks delivered by said tow conveyor and to move the same at an accelerated rate onto said primary turntable, a second speed-up conveyor between said primary turntable and said second mentioned tow conveyor adapted to move trucks at an accelerated rate from said primary turntable to said tow conveyor, a plurality of caster turntables on and rotatable relative to said primary turntable and revolvable thereby for supporting the casters of a truck disposed on said primary turntable, means for rotating said primary turntable, and means for controlling rotation of the caster turntables whereby each caster turntable rotates once relative to the primary turntable for each rotation of said primary turntable.

14. In a conveyor system, a primary turntable for caster trucks adapted to accommodate a truck bodily thereon and having a plurality of relatively small individual caster turntables one for each caster of the truck, said caster turntables being positioned to engage and support the truck casters when the truck is disposed bodily on said primary turntable, a tow conveyor arranged and adapted to deliver caster trucks at one side of said primary turntable, a tow conveyor arranged to pick up caster trucks from another side of said primary turntable, a speed-up conveyor interposed between said first mentioned tow conveyor and said primary turntable operative to move trucks delivered by said first mentioned tow conveyor onto said primary turntable, a second speed-up conveyor interposed between said second mentioned tow conveyor and said primary turntable operative to move trucks from said primary turntable and to position them for engagement by said second mentioned tow conveyor, means for rotating said primary turntable whereby to revolve said caster turntables about the axis of said primary turntable, and means for controlling rotation of said caster turntables whereby each caster turntable rotates once relative to the primary turntable for each rotation of said primary turntable.

References Cited in the file of this patent

UNITED STATES PATENTS

| | | |
|---|---|---|
| 761,484 | Hetzel | May 31, 1904 |
| 1,087,424 | Bauman | Feb. 17, 1914 |
| 1,322,456 | King | Nov. 18, 1919 |
| 1,323,902 | Obolewicz | Dec. 2, 1919 |
| 1,431,248 | Norris | Oct. 10, 1922 |
| 1,442,148 | Hilpert | Jan. 16, 1923 |
| 1,523,154 | Yuskewicz | Jan. 13, 1925 |
| 1,775,661 | Whalen | Sept. 16, 1930 |
| 1,819,017 | Drake | Aug. 18, 1931 |
| 1,827,886 | Gillespie | Oct. 20, 1931 |
| 1,903,488 | Stibbs | Apr. 11, 1933 |
| 1,949,691 | Nehrer et al. | Mar. 6, 1934 |
| 2,040,353 | Wilson | May 12, 1936 |
| 2,044,031 | Van Nieuland | June 16, 1936 |
| 2,586,264 | Rose | Feb. 19, 1952 |